United States Patent [19]

Norton

[11] Patent Number: 5,194,285

[45] Date of Patent: * Mar. 16, 1993

[54] PROCESS FOR PREPARING A WATER-IN-OIL DISPERSION HAVING A DISPERSED GELLED AQUEOUS PHASE

[75] Inventor: Ian T. Norton, Rushden, Great Britain

[73] Assignee: Van den Bergh Foods Co., Division of Conopco, Inc., Lisle, Ill.

[*] Notice: The portion of the term of this patent subsequent to Sep. 29, 2009 has been disclaimed.

[21] Appl. No.: 703,062

[22] Filed: May 20, 1991

Related U.S. Application Data

[62] Division of Ser. No. 521,518, May 10, 1990, abandoned.

[30] Foreign Application Priority Data

May 16, 1989 [EP] European Pat. Off. ........ 89201210.5

[51] Int. Cl.$^5$ .............................................. A23D 7/00
[52] U.S. Cl. .................................... 426/603; 426/573; 426/602; 426/663
[58] Field of Search ............... 426/573, 602, 603, 804, 426/663

[56] References Cited

U.S. PATENT DOCUMENTS

| | | | |
|---|---|---|---|
| 4,305,970 | 12/1981 | Moran et al. | 426/603 |
| 4,389,426 | 6/1983 | Reissmann et al. | 426/602 |
| 4,414,236 | 11/1983 | Moran et al. | 426/573 |
| 4,917,915 | 4/1990 | Cain et al. | 426/573 |
| 4,943,445 | 7/1990 | Norton et al. | 426/573 |

FOREIGN PATENT DOCUMENTS

| | | |
|---|---|---|
| 237120 | 9/1987 | European Pat. Off. |
| 279499 | 6/1988 | European Pat. Off. |
| 293980 | 12/1988 | European Pat. Off. |
| 297690 | 1/1989 | European Pat. Off. |
| 2035360 | 6/1980 | United Kingdom |
| 2084171 | 4/1982 | United Kingdom |

*Primary Examiner*—Donald E. Czaja
*Assistant Examiner*—Evan Federman
*Attorney, Agent, or Firm*—A. Kate Huffman

[57] ABSTRACT

The present invention is concerned with a process for preparing a dispersion comprising a continuous fat phase and a dispersed gelled aqueous phase, wherein a water-continuous composition, containing, calculated on the water:

(i) more than 200 ppm amino acid residues; and
(ii) more than the critical concentration of one or more gelling polysaccharides capable of forming a reversible gel, is cooled from above the gel setting temperature of the water-continuous composition to below said gel setting temperature and subjected to such conditions of shear that the water-continuous composition is converted into small gelled aqueous beads, after which a fat-continuous dispersion is formed while maintaining the temperature at below the gel melting temperature.

7 Claims, No Drawings

PROCESS FOR PREPARING A WATER-IN-OIL DISPERSION HAVING A DISPERSED GELLED AQUEOUS PHASE

This is a divisional application of Ser. No. 07/521,518 filed May 10, 1990 now abandoned.

FIELD OF THE INVENTION

The present invention is concerned with a dispersion comprising a continuous fat phase and a dispersed gelled aqueous phase, and a process for preparing such dispersion. In particular the present invention relates to a water-in-oil dispersion of extremely low fat content, such as for instance a spread containing from 5 to 30 wt. % fat and a dispersed gelled aqueous phase

BACKGROUND OF THE INVENTION

In European patent application no. 0 237 120 spreads comprising less than 35 wt. % fat and a gel-forming aqueous phase having a relatively high viscosity are described. These spreads are prepared by admixing the aqueous phase and fat phase at a temperature of 60° or 70° C. and further processing the emulsion so obtained through two cooled C-units or alternatively through a sequence of two cooled A-units followed by a high shear mixer European patent application no. 0 237 120 furthermore describes very low fat spreads containing substantial amounts of iota- or kappa-carrageenan.

European patent application 0 279 499 describes edible fat-continuous dispersions having a fat content of less than 30% by weight and containing an aqueous phase having a viscosity of less than 400 mPa.s at 35° C. and a shear rate of 1000 s-$^{-1}$ and containing less than 200 ppm amino acid residues, calculated on the weight of the aqueous phase.

SUMMARY OF THE INVENTION

We have found now that stable water-in-oil dispersions having very advantageous properties can be prepared by cooling a water-continuous composition containing in combination
 (i) a gelling amount of one or more gelling polysaccharides capable of forming a reversible gel, and
 (ii) a significant amount of amino acid residues, to a temperature below the gel setting temperature during a sufficiently long period of time to allow the formation of a gel structure, subjecting said water-continuous composition to shear so as to convert it into small gelled aqueous beads and forming a fat-continuous dispersion.

DETAILED DESCRIPTION OF PREFERRED EMBODIMENTS

Accordingly one aspect of the present invention is a process for preparing a dispersion comprising a continuous fat phase and a dispersed gelled aqueous phase, wherein a water-continuous composition, containing, calculated on the water:
 (i) more than 200 ppm amino acid residues; and
 (ii) more than the critical concentration of one or more gelling polysaccharides capable of forming a reversible gel,
is cooled from above the gel setting temperature of the water-continuous composition to below said gel setting temperature and subjected to such conditions of shear that the water-continuous composition is converted into small gelled aqueous beads, after which a fat-continuous dispersion is formed while maintaining the temperature at below the gel melting temperature.

Here by a reversible gel is meant an aqueous gel that melts when heated and again forms a gel when cooled down subsequently. Examples of gelling polysaccharides capable of forming reversible gels are: agar, carrageenan, furcelleran, gellan, etc.

By the gel setting temperature as referred to in this application is meant the temperature at which, upon slowly cooling down, an ordered gel structure is formed. The gel setting temperature of an aqueous composition can be determined by heating the composition to above the gel melting point, splitting it up in a number of samples which are subsequently equilibrated, under quiescent conditions, at different temperatures lying 1 centigrade apart, and putting a steel ball of about 1 mm diameter on each of the samples after equilibration during 15 minutes If the samples are ordered in accordance with the temperature at which the samples were equilibrated, starting from the sample equilibrated at the highest temperature, the gel setting temperature is the equilibration temperature of the first sample through which the steel ball does not sink.

The melting temperature of a gel can suitably be measured using the following procedure: Pour a sample into a glass test tube and allow it to set fully at 5° C. Then place the tube in a water jacket connected to a programmable water bath. Place a steel ball, having a diameter of approximately 1 mm, on the surface of the sample and depress slightly in order to minimize surface tension effects. Equilibrate for one hour at 25 C, or a lower temperature in case of a low melting gel, and then apply a heating regime of 0.05° C./min. The gel melting point is the temperature at which the ball begins to sink through the sample. Movement of the ball can be observed using a travelling microscope.

In traditional industrial processes for the preparation of low fat water-in-oil dispersions, where gelation is largely observed after a fat-continuous emulsion has been formed, the presence of substantial amounts of amino acid residues promotes the formation of O/W emulsions and therefore hinders or renders impossible the preparation of fat-continuous dispersions The latter problem has been solved by using very viscous aqueous phase systems as described in EP-A 0 237 120, or alternatively by avoiding the presence of destabilizing amounts of protein in the aqueous phase (EP-A 0 279 499).

The process according to the invention offers the advantage that it enables the simple preparation of water-in-oil dispersions of very low fat content. The latter dispersions moreover are stable under storage conditions and destabilize readily in the mouth, due to the presence of a significant amount of amino acid residues.

The gel structure present in the aqueous phase stabilizes the dispersion and prevents the formation of a water-continuous system which would spontaneously occur in the absence of such structure. At higher temperatures the gel structure becomes less rigid and the destabilizing influence of the amino acid residues becomes more manifest. Accordingly at mouth temperature the present fat-continuous dispersion will become unstable and invert to a water-continuous system, thereby releasing its flavour.

The presence of a gel structure in the water-continuous composition used in the present process provides the fat-continuous system formed with sufficient structure to prevent it from re-inverting to a water-continuous composition. In traditional processing where a gel structure is only formed after the formation of a fat-continuous emulsion, the risk of re-inversion, in particular in the presence of substantial amounts of amino acid residues, is much higher than in the present process.

Yet another advantage of the present process is the fact that it makes it possible to control the aqueous phase droplet size distribution in the final dispersion. The droplet size distribution of the aqueous phase is very important as regards the oral response, appearance and stability of water-in-oil dispersions. Also the release of flavour components from the dispersed aqueous phase is largely determined by the droplet size distribution of said aqueous phase.

The advantages of the present process are particularly appreciated in the preparation of dispersions of very low fat content. Thus in a preferred embodiment, the present invention relates to a process for the preparation of a dispersion comprising from 5–30% by weight of a continuous fat phase and from 70–95% by weight of a dispersed gelled aqueous phase. The present process enables the preparation of stable dispersions containing substantially less than 25% by weight of fat. Food products based on a dispersion having so low a fat content are particularly desirable because of their low calorific content. Thus in a very preferred embodiment of the invention the process relates to a process for preparing an edible dispersion comprising from 8–27 wt. % continuous fat phase and 92–73 wt. % dispersed gelled aqueous phase.

The gelled beads formed in the present process can be difficult to visualize as in the present process the fat-continuous dispersion is normally formed before the gelation process is completed. As long as the gelation process is not completed, the gelled beads formed, when kept under quiescent conditions at below the gel melting temperature as is normally required if the gel beads are to be visualized by means of, for instance, a microscope, will tend to coalesce by cross-linking.

In this specification, unless otherwise indicated, the term 'fat' refers to edible fatty substances in a general sense, including natural or synthesized fats and oils consisting essentially of triglycerides such as, for example, soybean oil, sunflower oil, palm oil, coconut oil, fish oil, lard and tallow, which may have been partially or completely hydrogenated or modified otherwise, as well as non-toxic fatty materials having properties similar to triglycerides, which materials may be indigestible, such as for example waxes, e.g. jojoba oil and hydrogenated jojoba oil, and polyol fatty acid polyesters referred to hereinafter in more detail. The terms fat and oil are used interchangeably.

In this specification the term 'polyol' is intended to refer to any aliphatic or aromatic compound which comprises at least four free hydroxyl groups. Such polyols in particular include the group of sugar polyols, which comprises the sugars, i.e. the mono-, di- and oligosaccharides, the corresponding sugar alcohols and the derivatives thereof having at least four free hydroxyl groups. Examples of sugar polyols include glucose, mannose, galactose, xylose, fructose, sorbose, tagatose, ribulose, xylulose, maltose, lactose, cellobiose, raffinose, sucrose, erythritol, mannitol, lactitol, sorbitol, xylitol and alpha-methylglucoside. A generally used and preferred sugar polyol is sucrose.

In this specification the term 'polyol fatty acid polyester' is intended to refer to any such polyesters or mixtures thereof of which, on an average, more than 70% of the polyol hydroxyl groups have been esterified with fatty acids. In this specification by 'indigestible' is meant that at least about 70% by weight of the material concerned is not digested by the human body.

We have found that the present process can very advantageously be employed in the production of spreads of very low fat content. The spreads prepared by the present process, even when having a fat content as low as about 20 wt. %, have an oral response which is very much like commercially available spreads comprising about 40 wt. % fat. Furthermore these spreads are found to be easy spreadable and do not loose water on spreading.

It is crucial that in the present process the water-continuous composition is maintained at a sufficiently low temperature for such a period of time that the cross-linking mechanism leading to gelation starts to occur. In order to obtain such structure it is generally advisable to maintain the water-continuous composition at a temperature below the gel setting temperature for at least 20 seconds prior to the formation of the fat-continuous dispersion. More preferably the water-continuous composition is maintained at a temperature of at least 5° C. below the gel setting temperature for at least 30 seconds prior to the formation of the fat-continuous dispersion.

In the present process, preferably, the cooling regime and residence time employed till the formation of the fat-continuous dispersion are such that under quiescent conditions a gel having a shear modulus of more than 50 Pa., preferably of more than 70 Pa., would have formed.

The following method can suitably be used to determine the shear modulus: Fit a Bohlin VOR Rheometer, or equivalent apparatus, with a 30 mm plate and 5 degree cone geometry Heat the sample to a temperature at least 10° C. above its gel melting temperature and then bring it to the starting temperature employed in the process. Place the liquid sample to be tested between the cone and the plate and set the gap at the plate edge to be 1 mm. Apply silicone oil to the plate edge to prevent the sample from drying out. Equilibrate the sample at the starting temperature and set the frequency of oscillation (f) to be 1 Hz and the strain to be 7.2 degrees. Apply a cooling regime as used in the process, maintain continuous sinusoidal oscillation and record compliant strain at convenient time intervals. The shear storage modulus (G') can then be calculated from the following relationship:

$$G' = v_{21}^0/\gamma_{21}^0 \cos$$

where
$v_{21}^0 = v_{21}/\sin(\omega t + \delta)$
$\nu_{21}^0 = \nu_{21}/\sin \omega t$
$v$ is the shear stress
$\gamma$ is the shear strain and $\delta$ is the phase angle More detailed information may be found in "Viscoelastic Properties of Polymers" by J. D. Ferry, Chapter 1, pages 4–16, Std Book Number 471 25774 5, published by J. Wiley & Sons Inc.

The conversion of the water-continuous composition to small gelled aqueous beads can suitably be effected by means of several devices known in the art. Examples of suitable devices are: Votators TM (A-units), crystallizers (C-units), static mixers, Ultra Turax TM mixers, etc. Preferably the conversion is effected by means of one or more devices in which the water-continuous composition can be cooled and/or subjected to shear.

Preferably at least one of these devices is provided with rotating means for imparting shear to said composition.

In order to facilitate processing and also to obtain a very stable dispersion, it is advisable that prior to the formation of the fat-continuous dispersion the gelled beads have been reduced to a relatively small size. Accordingly in a preferred embodiment of the invention the water-continuous composition is converted to small gelled aqueous beads having a volume weighted mean diameter of less than 150 microns prior to the formation of the fat-continuous dispersion.

The formation of the fat-continuous dispersion can suitably be accomplished by two alternative routes. The first route is a process wherein the water-continuous composition contains from 5 to 27% by weight of dispersed fat and is inverted to a fat-continuous dispersion after the fat-containing water-continuous composition has been converted to gelled aqueous beads. The term 'inversion' is used here to indicate that a water-continuous system containing a dispersed fat phase is converted into a water-in-oil dispersion. Such a water-continuous system in accordance with the invention can be composed of numerous small gelled aqueous beads containing dispersed fat droplets. It is to be understood that the inversion of a water-continuous composition to a water-in-oil dispersion in the present process is normally not an instantaneous event. Indeed the inversion of a water-continuous fat-containing composition to a water-in-oil dispersion can involve the formation of a transient bi-continuous system or a transient system which is partly fat- and partly water-continuous.

The second route is a process wherein the water-continuous composition after having been converted to small gelled aqueous beads is combined with a separate fat-continuous stream to form a fat-continuous dispersion. This process differs from the first route in that the fat is added after the aqueous phase composition of the final dispersion has been converted to gelled aqueous beads. Although the aqueous phase composition may already contain some dispersed fat, it is preferred that the bulk of the fat as present in the final dispersion is added in a separate fat-continuous stream after the gelled aqueous beads have been formed. The combination of the water-continuous with the fat-continuous stream preferably is carried out in such a manner that a fat-continuous system is formed, rather than a water-continuous system which additionally needs to be inverted to the final water-in-oil dispersion. If, as is the case in the present process, the gelled beads to be combined with the fat are sufficiently structured, the fat can easily be worked around the gelled beads to form a fat-continuous dispersion.

In both routes described above, after the gelled beads have formed, the further steps required to form a water-in-oil dispersion, preferably involve the application of shear to either invert the fat-containing gelled beads, or alternatively to thoroughly admix the gelled beads and the fat stream. Since these shear conditions may reduce the average size of the gelled beads, it is not necessary that, before formation of the fat-continuous dispersion, the gelled beads are of the size aimed for in the final product. Thus the gelled beads may be relatively large before incorporation, however generally have a size of less than 150 microns. In a preferred embodiment the gelled beads are relatively small before the formation of the fat-continuous dispersion as it is more convenient to control the size of the beads before the formation of the fat-continuous dispersion than during the inversion or admixing. Thus advantageously the gelled beads have a volume weighted mean diameter of less than 100 microns, more preferably of less than 70 microns, prior to the formation of the fat-continuous dispersion.

Another aspect of the present invention is an edible dispersion containing less than 30% by weight of a continuous fat phase and at least 70 wt. % of a gelled aqueous phase, wherein the aqueous phase contains (i) one or more gelling polysaccharides, capable of forming a reversible gel, at a concentration level of 1 to 6 times the critical concentration of said gelling polysaccharide(s), and (ii) more than 200 ppm amino acid residues.

The dispersions according to the present invention are stable, ie. they do not display water- or oil exudation even when subjected to temperature cycling nor do they loose water on spreading. Furthermore the present spreads have a significantly better oral response than spreads of similar fat content described in the prior art. This improved oral response may be explained from the presence of a significant amount of amino acid residues, particularly protein, in combination with a melting gel structure. The gel structure stabilizes the product structure in the lower temperature-range normally encountered during storage. At higher temperatures i.e. in the temperature range above 30° C., the gel structure will become less manifest and the destabilizing influence of the amino acid residues will promote the inversion to a water-continuous system. The latter inversion is necessary to release the flavour components present in the dispersed aqueous phase.

We have found that the present dispersion is characterized by the fact that NMR measurements of the volume weighted mean droplet size show a relatively broad droplet diameter distribution. The droplet diameter distribution can suitably be measured by means of NMR (see J. Colloid and Interface Science 40 (1972), 206 and 93 (1983), 521) using a log-normal distribution as is commonly employed for particle size analysis. The dispersion made through the present process, as contrasted to dispersions of identical composition but prepared by means of conventional processing, show a broad droplet diameter distribution as illustrated by the figure found for sigma, which generally exceeds 0.9 microns.

Another aspect of the invention is therefore concerned with an edible dispersion containing less than 30% by weight of a continuous fat phase and at least 70 wt. % of a gelled aqueous phase, wherein sigma for the aqueous phase droplet diameter distribution exceeds 0.9 microns and the aqueous phase contains one or more gelling polysaccharides, capable of forming a reversible gel, at a concentration level of 1 to 6 times the critical concentration of said gelling polysaccharide(s). The high figures observed for the parameter sigma may be indicative of the fact that the aqueous phase in the present dispersion exhibits a bimodal droplet-distribution. According to a very preferred embodiment of the invention sigma exceeds 1.1 microns.

Preferably the gelling polysaccharide present in the dispersion is selected from the group consisting of kappa-carrageenan, iota-carrageenan, agar, furcelleran, gellan and mixtures thereof. Most preferably the gelling polysaccharide is kappa-carrageenan, iota-carrageenan or a mixture thereof.

In yet another preferred embodiment the aqueous phase of the dispersion contains a carrageenan gel structure having a transition midpoint temperature below 45°

C., more preferably below 40° C. The desired transition midpoint temperature can be obtained by adjusting the cationic concentration and composition of the aqueous phase. In EP-A 0 271 131 it is described how the transition temperature of carrageenan gels varies with the cationic composition of the aqueous phase. The midpoint temperature of the transition from ordered to disordered state can suitably be determined by measuring the optical rotation as described in Faraday Discuss. Chem. Soc. (1974) 57, 230–237. The use of a low-melting gel structure in the present dispersion offers the advantage that the dispersion destabilizes readily in the mouth. Spreads containing a low-melting gel structure consequently can have a very favourable oral response.

In a more preferred embodiment of the present invention the aqueous phase contains more than 300 ppm amino acid residues. The term amino acid residues as used throughout this document includes intact as well as denatured protein, di- and oligopeptides and free amino acid groups. In a very preferred embodiment the dispersion according to the invention contains more than 500 ppm amino acid residues, calculated on the aqueous phase.

Preferably the amino acid residues present in the dispersion according to the invention are protein(s). Examples of proteins that may advantageously be included in the present dispersion are: gelatin, milk protein (e.g. skim milk protein, whey protein, casein) and soy protein.

The present dispersion, in addition to the gelling polysaccharide(s), can suitably contain gelling components other than polysaccharides that form reversible gels, such as for instance gelatin, alginates, pectin, whey protein, starch, starch derivatives, soy protein, bovine serum protein or microcrystalline cellulose. Preferably the present dispersion contains gelling components other than gelling polysaccharides capable of forming reversible gels, at a concentration level below 2 times, preferably below 1 time the critical concentration of said gelling component(s).

The present dispersion can furthermore contain ingredients such as emulsifiers, thickeners, colourings, flavourings etc. Examples of thickening agents that can suitably be used in the present dispersion are locust bean gum, gaur gum, xanthan gum and alginate salts of monovalent cations.

The critical concentration of a gelling agent is the concentration level at which said gelling agent will start to form a gel. The critical concentration of the gelling polysaccharide(s) in the aqueous phase of the present dispersion is determined in an aqueous system which has exactly the same composition as the aqueous phase to be incorporated into the spread (except for the absence of gelling components other than polysaccharides capable of forming reversible gels, which optionally may be included therein and with the exception of the water content and the concentration of gelling agent which have to be varied to establish the critical concentration).

The critical concentration of a gelling agent or a mixture of gelling agents in a particular composition can be calculated from measurements of the shear modulus of a series of samples containing different concentrations of gelling agent or mixture of gelling agents, as described in Br. Polymer J. 17 (1985), 164. If the critical concentration of a combination of gelling agents is to be determined, then the critical concentration of such mixture of gelling agents is determined in a manner analogous to the procedure described above. The composition of the mixture of gelling agents is kept constant and the weight concentration of said mixture is varied as if it consisted of only one single gelling agent According to a preferred embodiment of the invention, the aqueous phase contains a gelling polysaccharide, capable of forming a reversible gel, at a concentration level of 1.2 to 5 times, more preferably of 1.5 to 4.5 the critical concentration thereof.

The process according to the invention enables the preparation of dispersions without the necessity of utilizing highly viscous aqueous phase compositions. Thus dispersions comprising an aqueous phase having a relatively low viscosity can be prepared. Such dispersions are less thick in the mouth than dispersions having a highly viscous aqueous phase and moreover destabilize more rapidly in the mouth. Accordingly, in a preferred embodiment, the gelled aqueous phase has a viscosity of less than 30 mPa., more preferably less than 20 mPa.s at 5° C. and a shear rate of 17090 $s^{-1}$. The viscosity can suitably be measured in a Ferranti Shirley Viscometer TM, with a standard cone having a diameter of 7 cm, using the method described on page 3 of EP-A 0 237 120.

The size of the gelled aqueous phase droplets to a large extent determines the appearance, oral response and rheology of the dispersion. In the present dispersion, preferably, these gelled droplets have a number weighted mean diameter of less than 50 microns, preferably of less than 30 microns.

The invention is further illustrated by means of the following examples:

EXAMPLE 1

A spread containing 20 wt. % of a continuous fat phase and 80 wt. % of a dispersed gelled aqueous phase was prepared from a water-continuous emulsion obtained by admixing an oil phase and aqueous phase of the following composition:

| Oil phase (in wt. % on emulsion) | |
|---|---|
| Interesterified mixture of palm oil and palm kernel oil (2:3) | 3.58 |
| Soybean oil hardened to a slip melting point of 38° C. | 5.38 |
| Sunflower oil | 11.06 |
| Hymono 4404 (monoglycerides) | 0.15 |
| Bolec Z (lecithin) | 0.1 |
| | 20.27 |
| Aqueous phase (in wt. % on emulsion) | |
| Kappa carrageenan (containing 0.07 wt. % protein) | 1.2 |
| Sodium Chloride | 1.44 |
| Water | 77.09 |
| pH adjusted to 4.9 using lactic acid | |
| | 79.73 |

The water-continuous emulsion obtained after admixture of the above two phases at 45° C. was passed through a scraped surface heat exchanger (in this case a Votator TM cooled by means of ethylene glycol; also called an A-unit) and a cooled crystallizer (C-units) after which the product was filled into tubs. Inversion of the water-continuous emulsion to a fat-continuous dispersion was obtained in the cooled C-unit. The precise processing conditions in the units are recited below.

|  | Jacket Temp. (°C.) | Exit Temp. (°C.) | Rotation Speed (rpm) | Residence Time |
|---|---|---|---|---|
| A-unit | 30 | 32 | 1400 | 18 s. |
| C-unit | −4 | 10 | 1400 | 180 s. |

The fat-continuous spread so obtained was found to be easy spreadable and did not loose water on spreading. The product had a conductivity at 5°, 10°, 15° and 20° C. of respectively 28, 120, 230 and 170 micro-Siemens/cm, indicating that it contained a continuous fat phase and a discontinuous aqueous phase. The volume weighted mean diameter was determined by means of pulse NMR and found to be 6 microns, sigma was measured as 1.1 microns. The hardness-values of the product at 5° C. as determined by means of a cone penetrometer was found to be 210 g/cm$^2$.

EXAMPLE 2

Example 1 was repeated with the exception that the aqueous phase additionally contained 0.1% gelatin, by weight of water. The precise processing conditions were as follows:

|  | Jacket Temp. (°C.) | Exit Temp. (°C.) | Rotation Speed (rpm) | Residence Time |
|---|---|---|---|---|
| A-unit | 30 | 30 | 1400 | 18 |
| C-unit | −5 | 9 | 1400 | 180 |

The fat-continuous spread so obtained was found to be spreadable and did not loose water on spreading. The product had a conductivity at 5°, 10°, 15° and 20° C. of respectively 230, 210, 300 and 300 micro-Siemens/cm, indicating that it contained a continuous fat phase and a discontinuous aqueous phase. The volume weighted mean diameter was determined by means of pulse NMR and found to be 17 microns, sigma was found to be 1.2 microns. The hardness-values of the product at 5° and 10° C., as determined by means of a cone penetrometer were found to be 255 and 230 g/cm$^2$.

When compared with the product of Example 1, this product was found to break down more readily in the mouth. Also the in-mouth inversion to a water-continuous emulsion was found to be substantially faster than that of the product of Example A which gave a more waxy oral response.

Similar results are obtained if, instead of gelatin, similar levels of other proteins, e.g. milk protein or soya protein are employed.

I claim:

1. A process for preparing a dispersion having a continuous fat phase and a dispersed gelled aqueous phase comprising the steps of:
   (a) cooling a water-continuous composition having, calculated on the water, (i) more than 200 ppm amino acid residues and (ii) more than a critical concentration of 1 or more gelling polysaccharides capable of forming a reversible gel, from a temperature above a gel setting temperature of the water-continuous composition to a temperature below the gel setting temperature to form a cooled water continuous composition;
   (b) subjecting the cooled water-continuous composition to such conditions of shear that the water-continuous composition is converted into small gelled aqueous beads; and
   (c) forming a fat-continuous dispersion from the water-continuous composition or the cooled water-continuous composition while maintaining the temperature at below a gelled melting temperature.

2. A process according to claim 1, wherein the forming step further comprises forming the fat continuous dispersion having from 5 to 30% by weight of a continuous fat phase and from 70 to 95% by weight of a dispersed gelled aqueous phase.

3. A process according to claim 1, wherein the cooling and subjecting steps further comprise forming a gel under quiescent conditions having a shear modulus of more than 50 Pa.

4. A process according to claim 3, wherein the gel has the shear modulus of more than 70 Pa.

5. A process according to claim 1, wherein the subjecting step comprises forming the gelled aqueous beads having a volume weighed mean diameter of less than 100 microns.

6. A process according to claim 1, wherein the forming step further comprises inverting the water-continuous composition containing from 5 to 27% by weight of dispersed fat to a fat-continuous dispersion after the fat-containing water-continuous composition has been converted to the gelled beads.

7. A process according to claim 1, wherein the forming step further comprises combining the small gelled aqueous beads with a separate fat-continuous stream to form the fat-continuous dispersion.

* * * * *